Dec. 16, 1930.  A. L. DUNCAN  1,785,002
FRUIT PITTING AND CORING APPARATUS
Filed March 11, 1926  4 Sheets-Sheet 1
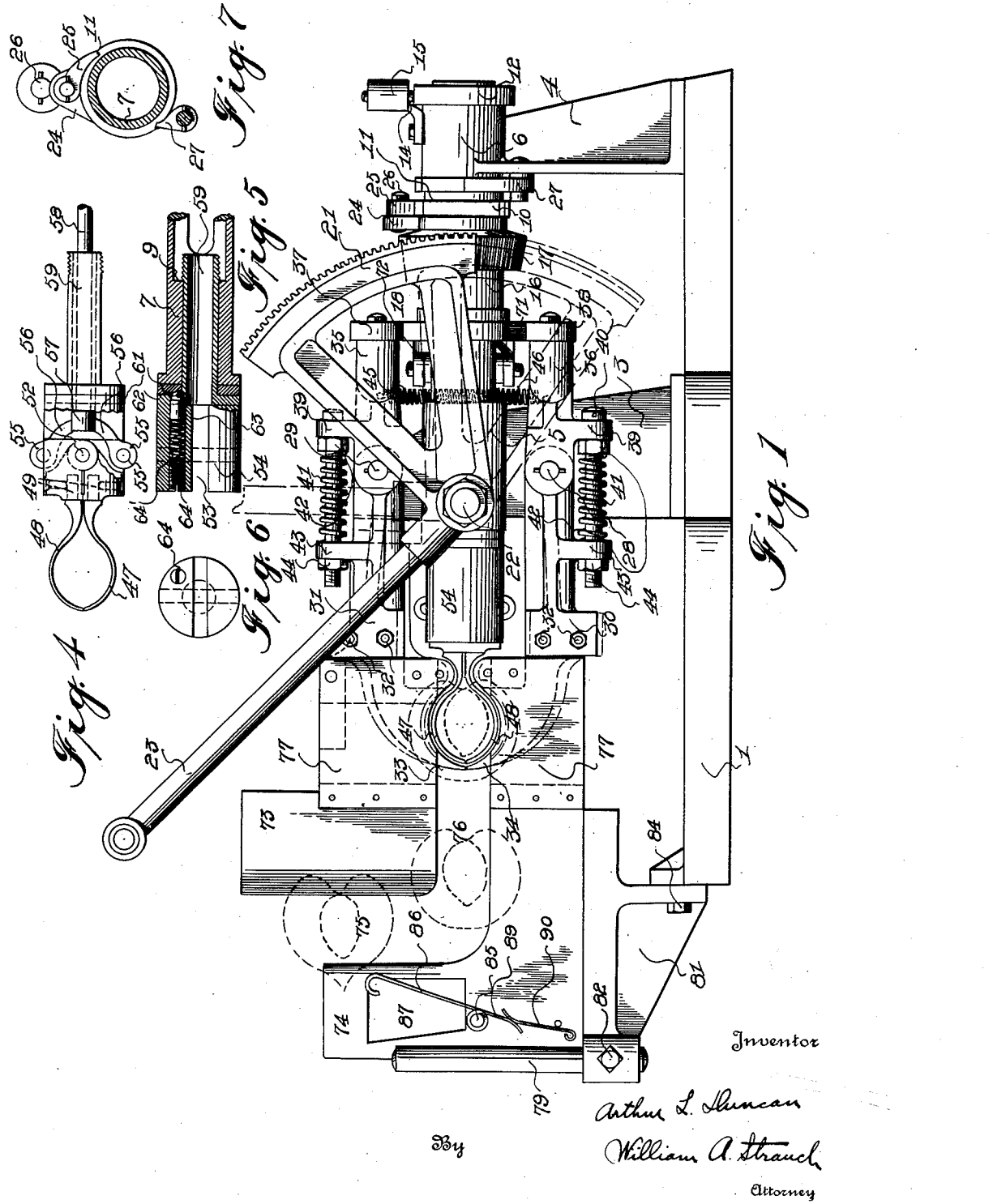
Inventor
Arthur L. Duncan
William A. Strauch
By
Attorney

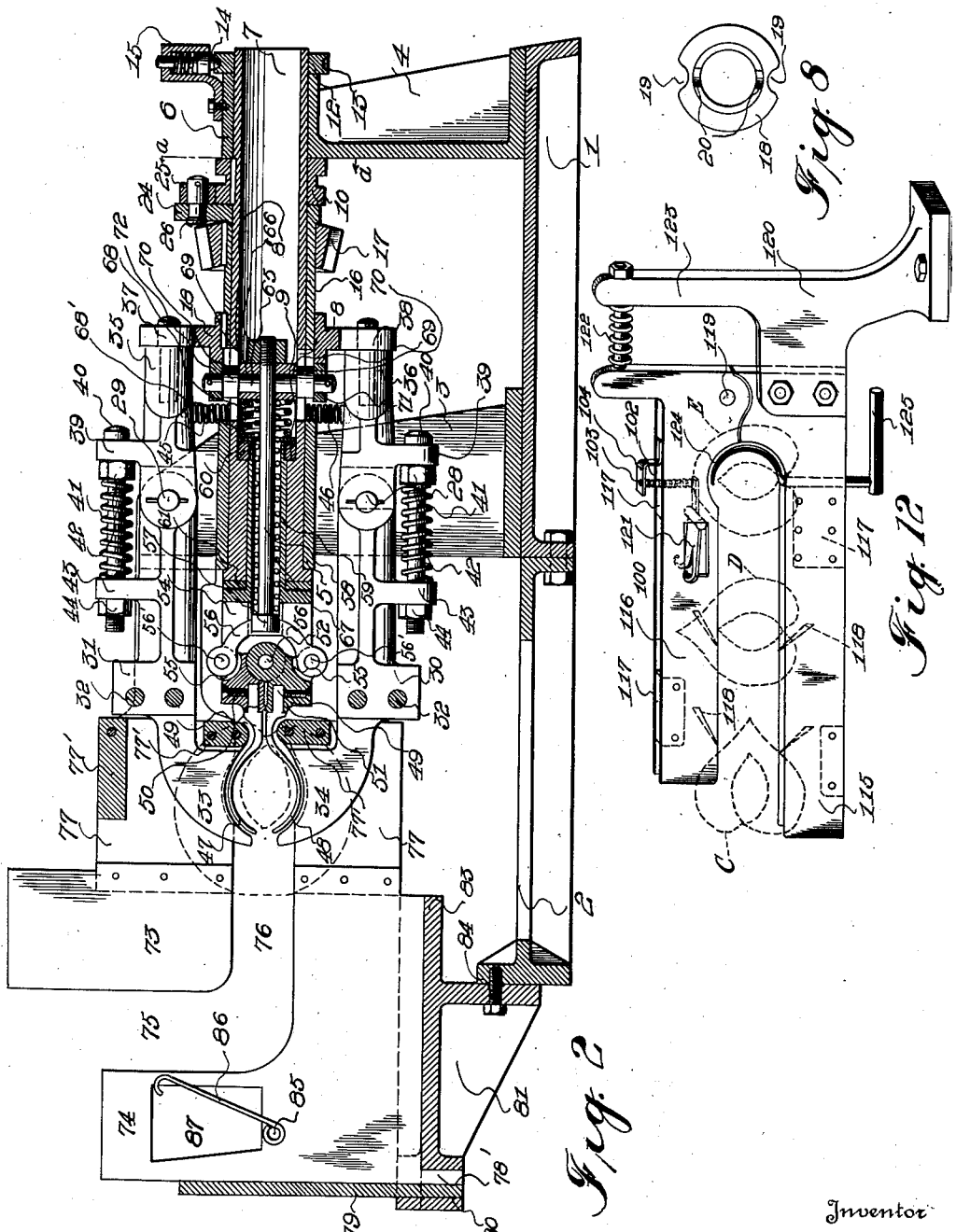

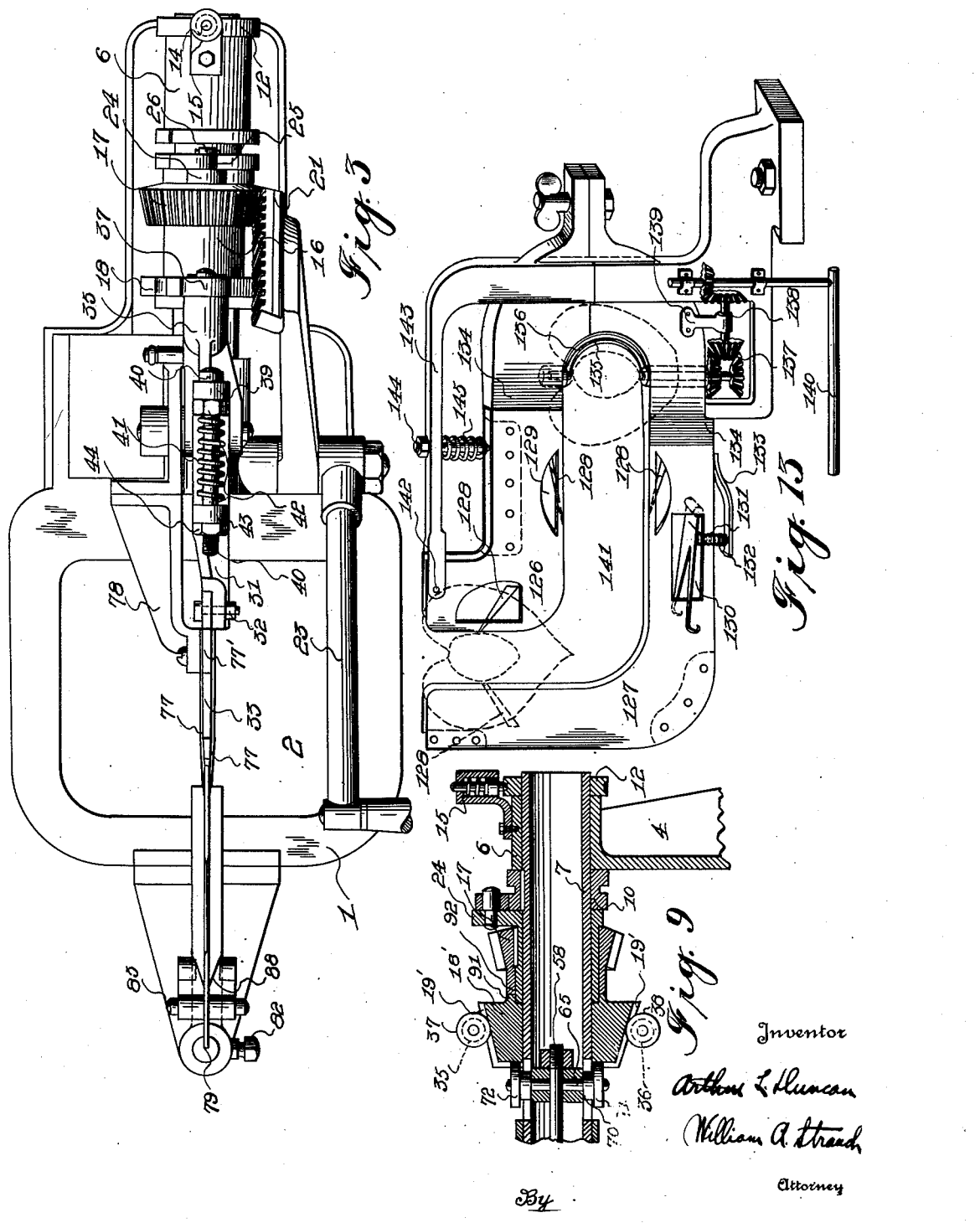

Patented Dec. 16, 1930

1,785,002

UNITED STATES PATENT OFFICE

ARTHUR L. DUNCAN, OF PIEDMONT, CALIFORNIA, ASSIGNOR, BY MESNE ASSIGNMENTS, TO PACIFIC MACHINERY COMPANY, OF SAN FRANCISCO, CALIFORNIA, A CORPORATION OF CALIFORNIA

FRUIT PITTING AND CORING APPARATUS

Application filed March 11, 1926. Serial No. 94,025.

The present invention relates to apparatus or device for stoning, pitting or coring fruit according to the process described and claimed in my co-pending application Serial Number 79,428, filed January 5, 1926. While the particular embodiments hereinafter set forth are especially designed for the pitting and halving of peaches, it will be readily appreciated by persons skilled in the art that my invention is applicable to the stoning, pitting or coring of other fruits such as plums, apricots, apples, pears, and the like.

An object of my invention is to provide manually operable devices of practical design, capable of a large output of halved fruit stoned or cored in such a way that waste is reduced to a minimum, and which will efficiently carry out the processes described in my co-pending case above referred to.

To this end means are provided to form a cut, channel or incision in the pulp of the fruit. When pitting peaches, this cut, channel, or incision is formed preferably in the plane of the rib or suture of the pit, which is indicated by the crease or depression in the pulp of the fruit, in this manner separating the pulp or flesh substantially to the rib edge or suture of the pit. A curved pitting knife, or knives, receivable in the line of the cut, channel or incision, are rotated about the pit and cut a central core of flesh embodying the substantially intact pit free from the pulp.

Another object of my invention is to provide pitting and coring apparatus embodying pulp dividing or separating knives that are spaced apart to provide a path for the pit of the peach with curved pitting or coring knives disposed at the end thereof. By this arrangement, a high speed in operation may be attained since the operator divides the pulp of the fruit substantially to the central core to be removed and positions it for the action of the coring knives by simply moving the fruit bodily to the end of the path.

It is a further object of my invention to provide pitting and coring apparatus of the character described in which means are provided to automatically adjust the curved knives to pits or stones of varying sizes.

Still another object of my invention is to provide a hand operated coring and pitting apparatus having wedging and supporting plates which separate the fruit pulp and having jaws which recede between the wedging plates, and automatically enter the channel, cut or incision formed in the pulp and close around the central core to be removed aiding the wedging plates to prevent turning of the fruit during the operation of cutting out the central core embodying the pit, by engagement of the sides of the jaws with the walls of the incision. These plates, due to their engagement with the flesh of the peach, serve to support the flesh at the beginning and termination of the cutting operation and the plates prevent the fruit pulp from being torn or scraped as the fruit is forced into position between the jaws. In this way the pitting knives are prevented from tearing the flesh of the fruit at the ends of the cut, and halves of fruit that present the neat appearance so essential to canned fruit of the highest grade are produced.

A further object of the invention is to provide means whereby the pitting knives will automatically become disconnected from the rotating drive shaft when a pit of unusual size is fed to the device, so that breaking of the knives will be avoided.

Still further objects are to provide means to trim the spike or tip from the end of the fruit pulp as it is fed into the machine; and to provide means for separating the pulp to a central core to be removed either by a wedging action, by removing a slice from the pulp, by simultaneously removing a slice and wedging the pulp apart, or by removing a slice and then wedging the pulp apart.

Further objects of the invention are such as may be attained by a utilization of the various combinations, sub-combinations and principles more fully hereinafter set forth and as defined by the scope of the appended claims.

As shown in the drawings:

Figure 1 is a side elevation of the preferred form of my invention.

Figure 2 is a central vertical cross section of the form shown in Figure 1.

Figure 3 is a plan view of this device.

Figures 4, 5 and 6 show details of the head that carries the knives.

Figure 7 is a cross section on the line A—A of Figure 2 looking in the direction of the arrow.

Figure 8 is a detail view of the cam used for actuating the gripping jaws and pitting knives in the form of invention illustrated in Figure 1.

Figure 9 is a detailed sectional view of a modified arrangement for actuating the gripping jaws and pitting knives in the form of invention shown in Figures 1 to 8.

Figures 10, 11, 12 and 13 are perspective views of modification of my invention.

Like reference numerals represent like parts throughout the various figures.

Figure 10:
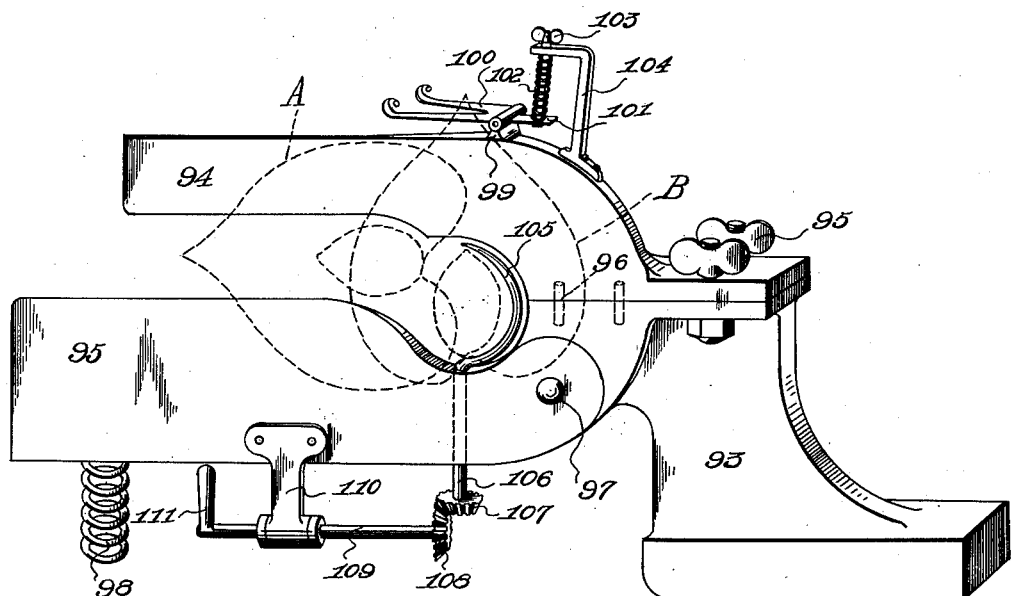

In the form of my invention shown in Figures 1 to 8 inclusive, a base 1, provided with an opening 2 to permit discharge of the halves and stoned fruit, supports standards 3 and 4 supporting bearings 5 and 6 (Figure 2) for a hollow shaft 7. Shaft 7 is provided with a pair of diametrically opposed slots 8 and an internal shoulder 9. Keyed to the shaft 8' adjacent bearing 6 is a double ratchet wheel 10 (Figures 2 and 7) having diametrically opposed teeth 11. Secured to the end of the shaft 7 adjacent the bearing 6 is an annular ring or collar 12 having notches 13 adapted to receive the frustro-conical tip of a spring pressed pin 14 housed in a member 15 secured by a cap screw to bearing 6.

Journalled on shaft 7 is a sleeve 16 to which are keyed a bevel gear 17 and a double cam 18. Cam 18 is provided with peripheral and lateral cam surfaces. The peripheral cam surface is provided with depressions 19 and the lateral cam is provided with depressions 20 for the purpose presently to be described.

Movement is imparted to sleeve 16 by a sector 21, (Figures 1 and 3) having teeth that mesh with the teeth of bevel gear 17. Sector 21 is pivoted to standard 3 at 22 and is operated by a hand lever 23 or in any other suitable manner.

Upstanding from the sleeve 16 is a lug 24 (Figures 2 and 7) carrying a pawl 25 pivoted on pin 26 and arranged to engage with the teeth 11 of ratchet wheel 10 keyed to shaft 7. Pivotally supported from standard 4 is a pawl 27 engaging the teeth 11 of the rear section double ratchet 10 to prevent reverse rotation of shaft 7 as will more fully hereinafter appear.

Pivotally supported from standard 3 on pins 28 and 29 are jaw carrying arms 30 and 31. To these arms are secured, by bolts 32, jaws 33 and 34. By the arrangement shown jaws 33 and 34 may be removed and smaller or larger jaws substituted according to the size of the fruit operated upon as will be readily understood.

Arms 30 and 31 are actuated by cam 18 through arms 35 and 36 pivoted on pins 28 and 29 and rollers 37 and 38 engaging the peripheral cam 18 and normally lying in depressions 19 thereof.

Arms 35 and 36 are provided with lugs 39 perforated transversely to receive elongated headed pins 40. Surrounding pins 40 are coil springs 41 which engage tension nuts 42 and lugs 43. Pins 40 pass through enlarged openings in lugs 43 projecting from arms 30 and 31 and are held in assembled relation by nuts 44. By the arrangement just described movement of arms 35 and 36 will be transmitted through springs 41 to arms 30 and 31 carrying jaws 33 and 34, as will be readily understood. Rollers 37 and 38 are maintained in contact with cam 18 by helical spring 46, the ends of which are secured by suitable pins driven into arms 35 and 36.

Curved pitting knives 47 and 48, shaped preferably as disclosed in my co-pending application Serial Number 79,428, filed January 5, 1926, are provided with shanks 49, fitting into recesses in the knife holders 50 and 51 and are held firmly in position by set screws. As will be readily understood knives 47 and 48 may be interchanged with other knives of differing sizes and shapes to conform roughly to the outline of the pit or core to be removed. Holders 50 and 51 (Figures 2 and 4) are pivoted at 52 in a recess or slot 53 in a knife carrying head 54 (Figures 2, 4, 5 and 6). Each of the holders 50 and 51 is provided with a lug 55 pivoted to the ends of yoke 56 which in turn is attached to the head 57 of a rod 58. The yoke 56 and rod 58 yield sufficiently to permit the pivotal movement of the knife holders about their pivot 52 as the knives are opened and closed.

The knife carrying head 54 is provided with a tubular extension 59 externally threaded at its end. Extension 59 is telescoped in the end of the hollow shaft 7 (see Figure 5) and held in position by a nut 60 threaded on the end thereof and engaging the internal shoulder 9 of the shaft 7. Between the end of shaft 7 and the knife carrying head 54 a hardened steel disc or ring 61 is disposed. Ring 61 is keyed on shaft 7. Disposed in a bore in the head 54 is a ball 62 in turn held in place by a threaded plug 64 and a compression spring 64'. Ball 62 is pressed into a recess in disc 61 providing a yielding connection between shaft 7 and head 54, whereby breakage of the pitting knives will be prevented in case the knives encounter a pit of unusual size.

In the hollow shaft 7 a sliding collar 65 (Figure 2) is positioned. This collar is bored transversely and radially. Rod 58 passes slidably through the transverse bore. A nut 66 threaded on rod 58 engages collar 65 and provides means for adjusting knives 47 and 48 in closed position. A spring 67 arranged between the head 57 of rod 58 and collar 65 yieldably connects said head and collar. A second spring 68 surrounding spring 67 and abutting against washer 68' holds sliding collar 65 against nut 66.

Secured in the radial bore of collar 65 are actuating members 69 provided with enlarged driving sections 70 which fit slidably into slots 8 in the shaft 7. Actuating members 69 are provided with rollers 71 and 72 which engage the lateral cam surface on cam member 18 and lie in grooves 20 in said cam when the knives 47 and 48 are in open position.

In order that the fruit may be presented to the jaws 33 and 34 and knives 47 and 48 with the pulp separated to the central core to be removed, spaced stationary knives 73 and 74 are provided. In the preferred form of my invention for pitting peaches a portion of the knives are spaced apart a distance approximately the greatest dimension of the pit in the plane of its suture, while the remaining portions thereof the knives are spaced apart a distance approximately the smaller dimension of the pit measured in the same plane. In this way paths 75 and 76 are provided. As shown the paths are in angular relation. However, as will be apparent paths 75 and 76 need not lie in angular relation as shown, but if not so arranged, the peach must be turned by the operator to change the position of the pit to complete the circumferential incision or channel as the peach is moved through said path.

Knives 73 and 74 are secured to between the forward end of the plates 77 which are bevel to enter and wedge the separated fruit pulp apart as clearly shown in Figure 3. The plates 77 straddle jaws 33 and 34 and are spaced apart a sufficient distance to permit movement of the jaws by the spacing member 77', and supported from the standard 3 by means of suitable brackets 78. While the knives 73 and 74 are shown as single bladed knives it will be understood that the double bladed slice removing and wedging knives shown in my above mentioned co-pending application may be used in obvious manner.

Knife 74 is provided with a tongue 78' (Figure 2) and the edge of this knife and the tongue fit into a kerf in post 79. Post 79 and the tongue 78' are inserted in an opening 80 in a bracket 81 and held in place by a set screw 82. Bracket 81 is grooved to receive the lower edge of blade 74 and is secured to base 1 by screws 84 or in any other suitable manner.

On a pin 85 passing through blade or knife 74, a spike or tip trimming knife 86 is pivotally mounted. The body portion of knife 86 lies in an opening 87 in knife 74. Its upper edge is provided with a V-cut 88 providing the cutting edges for removing the tip or spike. An extension 89 of knife 86 is engaged by a leaf spring 90 urging the knife yieldingly into the path of the tip or spike of the fruit as the latter is fed into the machine.

In operating this form of my invention, the operator of the device inserts fruit, such as peaches, in succession, between stationary blades 73 and 74 with the plane of the crease in the fruit in the plane of the blades and moves the fruit in the direction of the path 75 and 76 between said blades as indicated by the dotted line positions of the fruit in Figure 1. In passing through the vertical branch of this path kerfs or cuts will be cut in opposite ends of the fruit, while in passing the trimming knife 86 the spike or tip of the pulp of the peach will be removed. The operator moves the fruit to the end of the vertical branch of the path and then moves it horizontally which extends the kerf or cut around the peach. As the fruit is moved along this path the kerf or cut is widened into a channel by engagement with wedging and guide plates 77 at the ends of the knives. The fruit is moved horizontally until the pit lies between the opened pitting knives 47 and 48 and opened jaws 33 and 34.

In the position of parts shown in Figure 1 it will be understood that arm 23 is in actuated position, the jaws 33 and 34 are closed, gripping the peach and the knives 47 and 48 have been rotated to sever the pit from the pulp. With arm 23 moved clockwise until rack 21 is in its lower position as indicated by the broken lines in Figure 1, pawl 25 is out of engagement with teeth 11 of ratchet 10 and rollers 37 and 72 lie in recesses 19 and 20 of the cam 18. Knives 47 and 48 are nested in the recesses formed therefor in jaws 33 and 34 and the jaws together with the knives are in open position, retracted between plates 77. The fruit is forced by the operator to the end of its movement in path 76 when the pit will be in position to be encompassed by the closed jaws 33 and 34 and knives 47 and 48. The operator then moves the handle 23 from the normal or open position shown by the broken lines in Figure 1, to the full line position. Initial movement of arm 23 causes rotation of cam 18 which through its peripheral cam surface forces rollers 37 and 38 out of depressions 19 and rocks arms 35 and 36 outward about pins 28 and 29. This motion of arms 35 and 36 is transmitted through springs 41 to arms 30 and 31 causing the jaws 33 and 34 to close about the central bore and gripping the fruit. It will be noted that the ends of jaws 33 and 34 are beveled to aid in the gripping and to exert a wedging action as the jaws close around the central core to be removed. At the same time the lateral surface of cam 18 forces rollers 71 and 72 forward, shifting collar 65 to the left in Figure 1. This motion of collar 65 is transmitted through spring 67 and yoke 56 to yieldingly swing the pitting knives toward each other on their common pivot 52. These parts are then retained in closed position by cam 18 and further movement of arm 23 causes pawl 25 to engage a tooth 11 of ratchet and turns the knife actuating shaft 7 and closed knives 47 and 48 through an arc of 180 degrees causing the knives to enter the flesh of the fruit severing a central core embodying the pit to be removed therefrom. It will be noted that jaws 33 and 34 and plates 77 support the flesh of the fruit immediately adjacent the pitting knife resulting in clean cuts at the beginning and end of each operation of each pitting knife. The operation being completed, the operator returns lever 23 to its original position in which rollers 72 and 37 engage in recesses in cam 18 and with pawl 25 out of engagement with the teeth on ratchet 10. Shaft 7 is yeildingly held in this position by plunger 14 engaging notched ring 12 on the end of the shaft. The parts are then in position for the next operation.

Instead of the mechanism for causing the jaws and pitting knives to approach each other just described, mechanism illustrated in Figure 9 may be employed. In this form the means to operate rollers 37, 38, 71 and 72 is by sleeve 18' slidably journalled on shaft 7 and is held from rotation in normal position by engagement of rollers 37 in grooves 19', while the forward end thereof engages rollers 71 and 72. Sleeve 18' is provided with a section of gradually increasing diameter in which grooves 19' are formed and is moved endwise on shaft 7, closing jaws 33 and 34 by wedging rollers 37 and 38 outward and forcing rollers 71 and 72 forward closing knives 47 and 48. The endwise movement just referred to is produced by cam surfaces 91 and 92 formed on the ends of sleeve 18' and a tubular extension of bevel gear 17 respectively. In other respects the operation of this form of my invention is like that above described.

In Figures 10, 11, 12 and 13 other embodiments of my invention designed particularly to halve and to remove the pits of peaches or cores of fruit according to the process described and claimed in my copending application above identified are shown. In Figure 10 upon a standard 93 are mounted spaced knives 94 and 95 providing a path between them for the fruit core to be removed. The path is widened at one end and the knives are provided with wedge shaped sections so that the fruit to be cored, for example, a peach, may be swung through an arc of 90 degrees to bring the larger dimension of the pit between the knives 94 and 95 to complete an annular incision in the flesh of the peach and to wedge the pulp apart for entry of a pitting knife. Knife 94 is secured to the standard 93 by bolts 95 and pins 96 engaging matched recesses in the standard and knife. Knife 95 may be pivoted to standard 93 at 97 so that it may yield slightly, when an unusually large pit is encountered, against the action of a spring 98 arranged between the support for the device and the bottom edge of the knife. Pivotally mounted on a lug 99 is a trimming blade 100 providing a V-shaped cutting edge in position to trim the spike or tip from the pulp of a peach as it is swung from position A to position B shown in dotted lines. In order that blade 100 may be adjusted to peaches of varying sizes, it is provided with a rearward extension 101 engaging the bottom of a spring 102. Spring 102 surrounds a bolt 103 provided with an adjusting nut, and passing through an enlarged opening in extension 101 and through a member 104 attached to knife 94. By adjusting the bolt 103 it will be seen that the position of knife 94 will be varied.

Arranged to extend across the path between blades 94 and 95 is a rotatably mounted pitting knife 105. This knife conforms roughly to the contour of the pit of the peach. Secured to the shank 106 of the knife 105 is a bevel gear 107 meshing with a bevel pinion 108 secured to a shaft 109. Shaft 109 is supported in a bracket 110 attached to knife 95. Rotary motion is imparted to the shaft by a handle 111 manipulated by the operator after the peach is moved to the end of the path between knives 94 and 95 and swung into position B shown in Figure 10.

Figure 11:
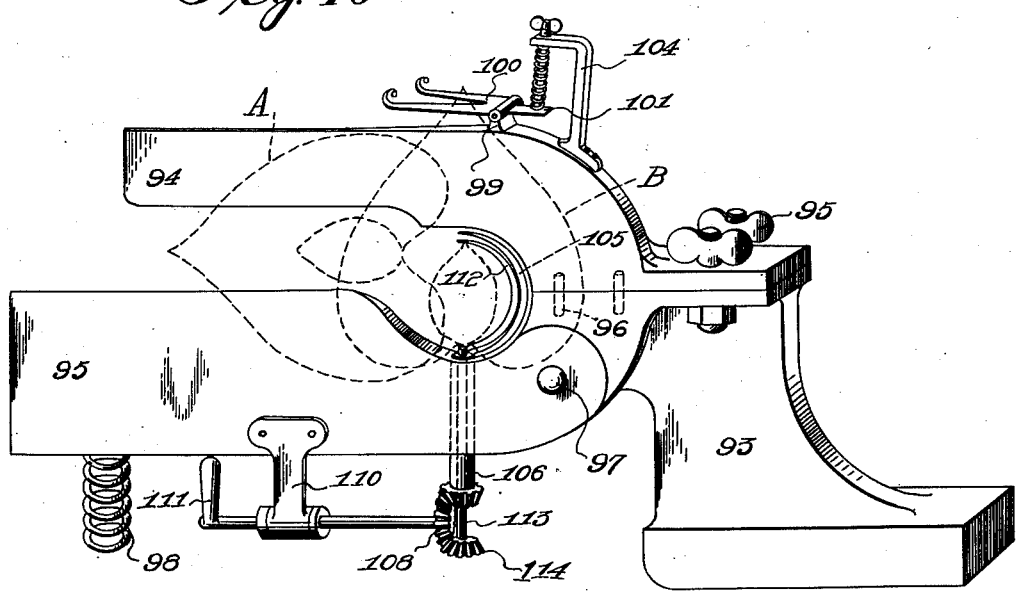

If desired two pitting knives may be employed arranged in nested relation as shown in Figure 11. In this event the knives move in opposite directions so as to simultaneously cut out the pit from both halves of the peach. By this arrangement it is unnecessary to hold the remaining half of the peach after one half has been cut from the pit, as is the case with the arrangement shown in Figure 10. The opposite rotation of the additional knife 112 is obtained by mounting the knife on a shaft 113 passing through and journalled in a bore in shaft 106, which is driven by a bevel gear 114 meshing with pinion 108.

When fruit having a fibrous growth around the suture of the pit is being stoned, I may employ a device such as designed to remove a narrow annular strip surrounding the suture of the pit. In this form of my invention, pairs of laterally spaced knives 115 and 116 are provided separated by spacing blocks 117. Arranged between the spaced knives are cutters 118 designed to remove the annular slice in sections as the peach is moved from position C through position D shown on Figure 12. The upper knife 116 in this case is pivoted at 119 to the lower knife 115 which is fixedly secured to support 120. The spike or tip removing knife 100 is arranged in a recess 121 extending through the upper pair of knives 116. A spring 122 arranged between a heel of the support for knife 116 and a projection 123 from support 120 permits the knives 115 and 116 to yield if a pit of unusual size is encountered. A curved pitting knife 124 extends across the path between the two pairs of knives 115 and 116. Knife 124 may be rotated by handle 125 to cut out the central core after the peach is moved into position E by the operator.

In Figure 13 is shown a device in which a portion of the knives for exposing the central core to be removed are spaced apart a distance substantially the same as the smallest dimension of the pit while other portions of said knives are spaced apart a distance approximating the major dimension of the pit in the plane of its suture. These knives are indicated by numerals 126 and 127. Preferably, but not necessarily, each knife consists of two laterally spaced blades, as shown on this figure. Between the spaced blades are arranged cutters 128 designed to remove sections of the annulus separated from the body of the peach by the spaced blades, as the peach is moved along the path provided between knives 126 and 127. The sections of the removed annulus may be discharged through openings 129. Arranged in an opening 130 is a pivoted spike or tip trimming knife 131. This knife carries a guiding stud 132 that passes loosely through an opening in a bracket 133 secured to knife 127. A coil spring surrounds said stud yieldingly using the trimmer into position, where its V-shaped cutting edge will remove the spike of the peach.

Cutters 126 and 127 are provided with wedge shaped portions 134 adjacent the end of the path between them to spread the flesh of the peach adjacent the incision to permit ready entry of the nested pitting knives 135 and 136 arranged as described in connection with Figure 11. In this form the bevel gears carried by the pitting knives are rotated by a bevel pinion 137 secured to a counter shaft 138 mounted in a bracket 139. Rotary motion is imparted to this shaft by hand lever 140 as will be obvious from the drawing.

Preferably, the upper knife is made in sections, the forward section 141 of which is pivoted at 142 to an overhanging bracket 143 secured to the supporting base. The opposite end of this section is hung from said bracket by a bolt 144 secured to the knife and passing loosely through an opening in the bracket. A coil spring 145 applies a yielding pressure to this knife section as will be apparent. In this form of the invention a narrow slice may be removed from the fruit by knives 126 and 127 and the wedging portion 134 will force the pulp sections apart a sufficient amount to permit entry of relatively wide pitting knives for cutting out the central core of the fruit.

While I have described various embodiments of my invention, in detail, it is to be understood that my invention is not limited to such details, but that the scope thereof is to be determined from the following claims:

What I claim is:

1. A peach halving and pitting device including bodily immovable knives spaced apart to permit passage of a pit between them, a portion of one knife being spaced from the other a distance approximating the width of the pit measured in the plane of its suture and another portion of one knife being spaced from a portion of said other knife a distance approximating the length of the pit measured in the same plane.

2. A peach halving and pitting device such as defined in the preceding claim in which portions of the knives are wedge-shaped, whereby an incision of substantial width will be formed in the peach.

3. A peach halving and pitting device such as defined in claim 1 in which the portions of the knives spaced apart a distance approximating the width of the pit extend substantially at right angles to the portions spaced apart a distance approximating the length of the pit.

4. A peach halving and pitting device comprising two pairs of separated bodily immovable knives, one pair of said knives being spaced from the other pair to permit the passage of the pit between them, whereby an annular slice may be cut from the peach when it is moved bodily through the space between the knives and rotated during such movement.

5. The combination defined in claim 4 in combination with means arranged between each pair of knives to remove sections of the annular slice as the peach is moved through the space between the pairs of knives.

6. The combination defined in claim 4 in which portions of the knives are wedge-shaped so that the width of the incision is increased.

7. A fruit halving and pitting device comprising spaced knives with wedging sections providing a path between them for the pit of the fruit, a pivotally mounted pitting knife extending across said path the pivotal axis of said knife lying substantially between the planes bounding the sides of said wedge-shaped knives, and means to rotate said pitting knife.

8. A fruit dividing and coring device comprising spaced knives providing a path between them for the core to be removed from the fruit, a pivotally mounted coring knife extending across said path, the intermediate portion of said coring knife being curved to substantially conform to the contour of the core to be removed, said last named knife normally lying substantially within the planes bounding the sides of said first named knives; and means to rotate said coring knife.

9. A peach halving and pitting device comprising bodily immovable spaced wedge-shaped knives providing a path between them for the pit of the peach, a pitting knife arranged in said path, means to support said peach during the operation of the pitting knife, and mechanism to rotate the pitting knife said mechanism including means to cause said supporting means to engage the peach before the operation of the pitting knife.

10. A peach halving and pitting device comprising bodily immovable spaced knives providing a path for the pit of the peach between them, portions of said knives being wedge-shaped, and a tip trimming knife arranged with its cutting edge adjacent said path.

11. The combination set forth in claim 10 in which the trimming knife is yieldable laterally of said path to automatically accommodate peaches of varying sizes.

12. A fruit dividing and coring machine comprising means for cutting an annular incision in the flesh of a peach in the plane of the suture of the pit, a rotatable head, pitting knives adjustably secured in said head, means to adjust said knives to pits of varying size, and mechanism to rotate said head.

13. A fruit dividing and coring machine comprising means for cutting an annular incision in the flesh of the peach in the plane of the suture of the pit, a rotatable head, adjustable pitting knives in said head, means to adjust the knives to pits of varying sizes, and mechanism to rotate said head, said mechanism including a yielding connection adapted to automatically yield when the knives are subjected to unusual strains.

14. A peach halving and pitting machine comprising means to form an incision of substantial width in the peach, means to cut the pit from the flesh of the fruit, the cutting edges of said incision forming means defining a pair of spaced planes and the pit cutting means being normally located between the planes, the said cutting edges defining the width of said incision.

15. A fruit dividing and coring device comprising a support, stationary spaced halving knives secured to said support providing a path for the pit of the peach between them, pitting knives extending across said path with their cutting edges substantially in the plane of the cutting edges of the halving knives, means to adjust said pitting knives to the size of the pit, and mechanism to rotate the pitting knives after the operation of the adjusting means.

16. A device as defined in claim 15 in which the mechanism rotating the pitting knives embodies a yielding connection whereby breakage of the knives will be prevented.

17. A fruit dividing and coring device comprising a support, stationary spaced halving knives secured to said support providing a path between them for the pit of the peach, holding jaws, pitting knives, means to adjust said jaws and pitting knives, said jaws and pitting knives being yieldable, and means to rotate the pitting knives.

18. A hand operated peach pitter comprising stationary means to form an incision in the peach to expose the suture of the pit, bodily rotatable pitting knives, supporting jaws, said jaws and pitting knives being pivotally mounted, a hand lever, and mechanism connecting said lever, jaws and pitting knives so that upon initial movement of the lever the jaws and pitting knives are swung upon their pivots and that upon continued movement of the lever the pitting knives are bodily rotated.

19. A hand operated pitter as defined in claim 18 in which the jaws and pitting knives are yieldable about their pivotal axes.

20. A hand pitter as defined in claim 18, including means permitting disconnection of the pitting knives when subjected to unusual strains.

21. A peach pitter comprising a frame, a hollow shaft supported thereby, pivotally mounted pitting knives carried by said shaft, supporting jaws pivoted in said frame, a collar slidable in said shaft, resilient means connecting said collar and pitting knives, unitary means to slide said collar to yieldingly move the pitting knives and to swing the supporting jaws about their pivots, operating means, and mechanism connecting said operating means to actuate said unitary means and to then rotate said shaft about its axis.

22. A peach pitter as defined in claim 21 in which the unitary means is an externally tapered sleeve slidable along the shaft and non-rotatable therewith.

23. A peach halving and pitting device comprising wedge-shaped bodily immovable halving knives spaced apart to provide a path between them for the pit of the peach, a plurality of pitting knives extending across said path with their cutting edges normally between the planes bounding the sides of said halving knives, and means to rotate said pitting knives to simultaneously cut both halves of the peach from the pit.

24. A fruit halving device including a pair of bodily immovable halving knives spaced apart to provide a path for the pit of the peach between them, one of said knives being capable of limited tilting about its pivotal mounting against the action of yielding means tending to hold it in fixed position.

25. A device of the class described, comprising stationary means having a guideway with portions arranged in angular relation to other portions for forming a circumferential groove in fruit passed therethrough, and means associated with the first mentioned means for removing the tip of the fruit as the fruit is guided by said stationary means.

26. In a peach pitting apparatus, a stationary pulp cutting knife adapted to remove exterior projections from the pulp as the fruit is advanced past the same, and means located in the path of the fruit for removing the pit from the pulp.

27. In a fruit pitter, the combination of a fixed impaling blade, a movable impaling blade forming an impaling member having a pit receiving recess, a revolvable pitting knife mounted in the said recess, and means for axially rotating the said pitting knife in the said recess.

28. In a fruit pitting apparatus, the combination of a fixed impaling blade, a movable impaling blade, the adjacent edges of the said impaling blades defining a pit receiving recess, a curved pitting knife mounted in said recess and secured to one of the said blades, the said last mentioned blade being tapered to spread the flesh of the fruit to accommodate the said pitting knife.

29. A peach halving and pitting device including spaced halving blades providing a path for the pit of the peach between them, a portion of one blade being spaced from the other a distance approximating the width of the pit measured in the plane of its suture and another portion of one blade being spaced from the other blade a distance approximating the length of the pit measured in the same plane and means arranged adjacent the end of said path and designed to enter the halving cut produced by said blades without substantial mutilation of the adjacent halves to cut the pit from said halves.

30. A peach halving and pitting machine including spaced halving blades arranged to form a halving cut in a peach while permitting the pit to pass between them, the blades being spaced different distances approximating several dimensions of the pit of the peach and being provided with wedge-shaped portions to spread the flesh of the fruit adjacent the halving cut and pitting means arranged in such position with respect to said blades that said means may enter the cut made by said blades without substantial mutilation of the peach halves.

31. A fruit pitting apparatus comprising a pair of impaling blades provided with cutting edges arranged to form a kerf substantially around the pit of the fruit as the fruit is moved between them, said blades being provided with matched recesses, and a curved pitting knife of a width approximating the width of said blades mounted for rotation laterally of said blades about the fruit pit and arranged with a substantial portion thereof normally following the contour of one of said recesses and in proximity to the edge thereof whereby the production of clean cut edges by the pitting knife is facilitated.

32. In a device for pitting fruit embodying a natural exterior crease or groove, an impaling blade for positioning the fruit according to the location of its exterior groove, and means for severing the tip of the fruit, said severing means being yieldably positioned to engage the fruit when guided by the impaling blade.

In testimony whereof I affix my signature.
ARTHUR L. DUNCAN.